US012809443B2

(12) United States Patent
Taninaka et al.

(10) Patent No.: US 12,809,443 B2
(45) Date of Patent: Nov. 24, 2026

(54) VEHICLE-MOUNTED SYSTEM, MANAGEMENT DEVICE, AND MANAGEMENT METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Yuta Taninaka, Yokkaichi (JP); Shunichi Sawano, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 82 days.

(21) Appl. No.: 18/729,207

(22) PCT Filed: Dec. 28, 2022

(86) PCT No.: PCT/JP2022/048477
§ 371 (c)(1),
(2) Date: Jul. 16, 2024

(87) PCT Pub. No.: WO2023/136158
PCT Pub. Date: Jul. 20, 2023

(65) Prior Publication Data
US 2025/0117059 A1 Apr. 10, 2025

(30) Foreign Application Priority Data
Jan. 17, 2022 (JP) ................................ 2022-005076

(51) Int. Cl.
*G06F 1/3209* (2019.01)

(52) U.S. Cl.
CPC ................................ *G06F 1/3209* (2013.01)

(58) Field of Classification Search
CPC . G06F 1/3209; G06F 1/3203; H04L 2209/84; Y02D 10/00
(Continued)

(56) References Cited

U.S. PATENT DOCUMENTS 8,924,744 B2 * 12/2014 Makino ................ G06F 1/3203 713/323
9,413,732 B2 * 8/2016 Koide .................... H04L 63/06
(Continued)

FOREIGN PATENT DOCUMENTS

JP 2012-205035 10/2012
JP 2015-107672 6/2015
(Continued)

OTHER PUBLICATIONS

International Search Report, Application No. PCT/JP2022/048477, mailed Mar. 20, 2023. ISA/Japan Patent Office.

*Primary Examiner* — Brian T Misiura
(74) *Attorney, Agent, or Firm* — Brooks Kushman P.C.

(57) ABSTRACT

In a vehicle-mounted system, a first ECU (or "first vehicle-mounted device") and a second ECU (or "second vehicle-mounted device") are connected to a communication bus. When the first ECU has received the first or second activation data via the communication bus in a low-power state where power consumption is low, the first ECU transitions to a high power state whose power consumption is larger than the low power state. When the second ECU has received the first data via the communication bus in a low-power state where power consumption is low, the second vehicle-mounted device is maintained in the low power state. When the second ECU has received the second data via the communication bus in the low-power state, the second ECU transitions to a high power state. A manage-
(Continued)

| | |
|---|---|
| First target | First ECU |
| Second target | First ECU and second ECU |
| Third target | Third ECU |
| Fourth target | Fourth ECU |
| Fifth target | Fifth ECU |

ment device transmits the first activation data and the second activation data via the communication bus.

12 Claims, 12 Drawing Sheets

(58) Field of Classification Search
USPC .......................................................... 713/320
See application file for complete search history.

(56) References Cited

U.S. PATENT DOCUMENTS

| | | | | |
|---|---|---|---|---|
| 9,635,151 | B2 * | 4/2017 | Shimomura | H04L 67/125 |
| 11,533,684 | B2 * | 12/2022 | Tokunaga | H04W 52/0274 |
| 12,107,703 | B2 * | 10/2024 | Aiba | H04L 12/12 |
| 12,463,844 | B2 * | 11/2025 | Saitoh | H04L 12/40006 |
| 2012/0030490 | A1 | 2/2012 | Makino et al. | |
| 2020/0204397 | A1 * | 6/2020 | Inoue | H04L 47/29 |

FOREIGN PATENT DOCUMENTS

| | | |
|---|---|---|
| JP | 2016-060433 | 4/2016 |
| JP | 2016-201740 | 12/2016 |
| JP | 2021-182679 | 11/2021 |

* cited by examiner

| | |
|---|---|
| First target | First ECU |
| Second target | First ECU and second ECU |
| Third target | Third ECU |
| Fourth target | Fourth ECU |
| Fifth target | Fifth ECU |

FIG. 7

Operating state table Ta

| | State | First target | Second target | Third target | Fourth target | Fifth target |
|---|---|---|---|---|---|---|
| First operation | Mid-execution | Necessary | unnecessary | unnecessary | unnecessary | unnecessary |
| Second operation | Mid-execution | unnecessary | Necessary | unnecessary | Necessary | unnecessary |
| Third operation | A | unnecessary | unnecessary | Necessary | unnecessary | unnecessary |
| Fourth operation | A | unnecessary | Necessary | unnecessary | Necessary | unnecessary |

A: Standing by for execution instruction

Target state table Tb

| First target | Second target | Third target | Fourth target | Fifth target |
|---|---|---|---|---|
| High power | High power | Low power | High power | Low power |

FIG. 9

| | Dark current | Maximum value of consumed power | Limit on response time |
|---|---|---|---|
| First ECU, Fifth ECU | below current threshold | below power threshold | — |
| | equal to or above current threshold | below power threshold | yes |
| Second ECU | below current threshold | equal to or above power threshold | — |
| | equal to or above current threshold | equal to or above power threshold | yes |
| Third ECU, Fourth ECU | equal to or above current threshold | — | no |

FIG. 13

| | Communication protocol | Dark current | Maximum value of consumed power | limit on response time |
|---|---|---|---|---|
| First ECU, Fifth ECU | CAN | below current threshold | below power threshold | — |
| | CAN | equal to or above current threshold | below power threshold | yes |
| Second ECU | CAN | below current threshold | equal to or above current threshold | — |
| | CAN | equal to or above current threshold | equal to or above current threshold | yes |
| Third ECU, Fourth ECU | CAN | equal to or above current threshold | — | no |
| | NOT CAN | — | — | — |

VEHICLE-MOUNTED SYSTEM, MANAGEMENT DEVICE, AND MANAGEMENT METHOD

CROSS-REFERENCE TO RELATED APPLICATIONS

This application is the U.S. national stage of PCT/JP2022/048477 filed on Dec. 28, 2022, which claims priority of Japanese Patent Application No. JP 2022-005076 filed on Jan. 17, 2022, the contents of which are incorporated herein.

TECHNICAL FIELD

The present disclosure relates to a vehicle-mounted system, a management device, and a management method.

BACKGROUND

JP 2021-182679A discloses a vehicle-mounted system in which a plurality of ECUs (Electronic Control Units) are connected to a communication bus. Each ECU communicates with the other ECUs via the communication bus.

In the vehicle-mounted system according to JP 2021-182679A, the power consumption of the plurality of ECUs is not considered.

The present disclosure was conceived in view of the situation described above and has an object of providing a vehicle-mounted system, a management device, and a management method capable of realizing low power consumption.

Advantageous Effects

According to the aspects described above, it is possible to realize low power consumption.

SUMMARY

A vehicle-mounted system according to an aspect of the present disclosure includes: a first vehicle-mounted device and a second vehicle-mounted device that are connected to a communication bus; and a processing unit for executing processing, wherein when, in a low-power state where power consumption is low, the first vehicle-mounted device has received first data or second data via the communication bus, a state of the first vehicle-mounted device transitions to a high power state whose power consumption is larger than the power consumption in the low power state, when, in a low-power state where power consumption is low, the second vehicle-mounted device has received the first data via the communication bus, a state of the second vehicle-mounted device is maintained in the low power state, when, in the low-power state, the second vehicle-mounted device has received the second data via the communication bus, a state of the second vehicle-mounted device transitions to a high power state whose power consumption is larger than the power consumption in the low power state, and the processing unit instructs transmission of the first data via the communication bus to cause the state of the first vehicle-mounted device to transition to the high power state, and instructs transmission of the second data via the communication bus to cause the states of the first vehicle-mounted device and the second vehicle-mounted device to transition to the high power state.

A management device according to an aspect of the present disclosure manages power consumption in a vehicle-mounted system that includes a first vehicle-mounted device and a second vehicle-mounted device that are connected to a communication bus, wherein when, in a low-power state where power consumption is low, the first vehicle-mounted device has received first data or second data via the communication bus, a state of the first vehicle-mounted device transitions to a high power state whose power consumption is larger than the power consumption in the low power state, when, in a low-power state where power consumption is low, the second vehicle-mounted device has received the first data via the communication bus, a state of the second vehicle-mounted device is maintained in the low power state, and when, in the low-power state, the second vehicle-mounted device has received the second data via the communication bus, a state of the second vehicle-mounted device transitions to a high power state whose power consumption is larger than the power consumption in the low power state, wherein the management device includes a processing unit for executing processing, and the processing unit instructs transmission of the first data via the communication bus to cause the state of the first vehicle-mounted device to transition to the high power state while keeping the second vehicle-mounted device in the low power state, and instructs transmission of the second data via the communication bus to cause the states of the first vehicle-mounted device and the second vehicle-mounted device to transition from the low power state to the high power state.

A management method according to an aspect of the present disclosure manages power consumption in a vehicle-mounted system that includes a first vehicle-mounted device and a second vehicle-mounted device that are connected to a communication bus, wherein when, in a low-power state where power consumption is low, the first vehicle-mounted device has received first data or second data via the communication bus, a state of the first vehicle-mounted device transitions to a high power state whose power consumption is larger than the power consumption in the low power state, when, in a low-power state where power consumption is low, the second vehicle-mounted device has received the first data via the communication bus, a state of the second vehicle-mounted device is maintained in the low power state, and when, in the low-power state, the second vehicle-mounted device has received the second data via the communication bus, a state of the second vehicle-mounted device transitions to a high power state whose power consumption is larger than the power consumption in the low power state, the management method causing a computer to execute: a step of instructing transmission of the first data via the communication bus to cause the state of the first vehicle-mounted device to transition to the high power state while keeping the second vehicle-mounted device in the low power state; and a step of instructing transmission of the second data via the communication bus to cause the states of the first vehicle-mounted device and the second vehicle-mounted device to transition from the low power state to the high power state.

Note that the present disclosure can be realized not only as a vehicle-mounted system or a management device that includes the characteristic processing unit described above, but also as a management method that includes such characteristic processing as steps, or as a computer program that causes a computer to execute such steps. The present disclosure can also be realized as a semiconductor integrated circuit that implements part or all of the vehicle-mounted system or the management device described above, or as a vehicle-mounted system that includes the management device.

BRIEF DESCRIPTION OF DRAWINGS

FIG. 7 depicts the contents of an operating state table and a target state table.

FIG. 9 is a table indicating the features of a first ECU to a fifth ECU.

FIG. 13 is a table indicating the features of a first ECU to a fifth ECU.

DETAILED DESCRIPTION OF PREFERRED EMBODIMENTS

Figure 1:
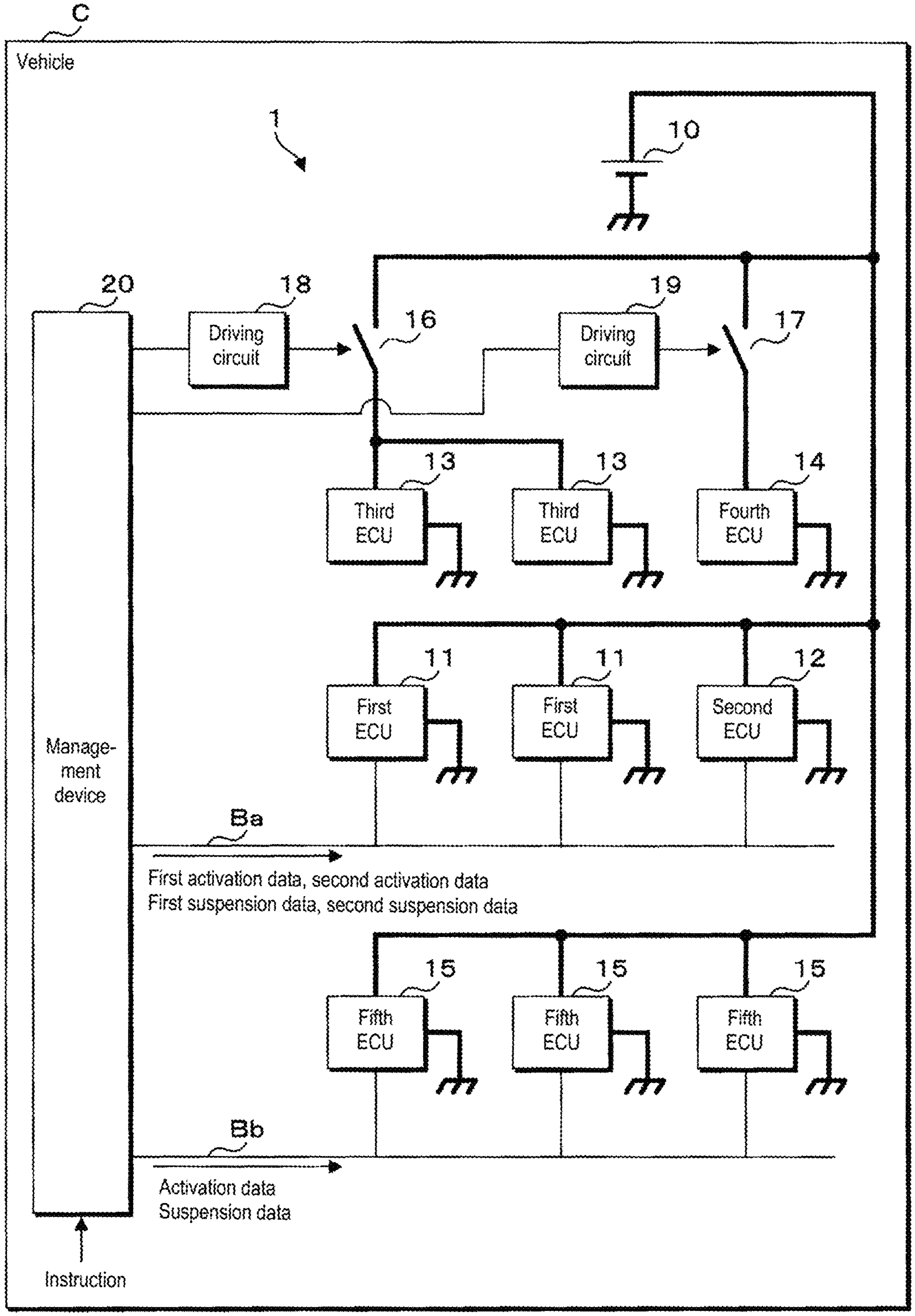
FIG. 1 is a block diagram depicting the configuration of a principal part of a vehicle-mounted system according to a first embodiment.

Several embodiments of the present disclosure will first be listed and described in outline. Note that the embodiments described below may also be freely combined, at least in part.

A vehicle-mounted system according to one aspect of the present disclosure is a vehicle-mounted system including: a first vehicle-mounted device and a second vehicle-mounted device that are connected to a communication bus; and a processing unit for executing processing, wherein when, in a low-power state where power consumption is low, the first vehicle-mounted device has received first data or second data via the communication bus, a state of the first vehicle-mounted device transitions to a high power state whose power consumption is larger than the power consumption in the low power state, when, in a low-power state where power consumption is low, the second vehicle-mounted device has received the first data via the communication bus, a state of the second vehicle-mounted device is maintained in the low power state, when, in the low-power state, the second vehicle-mounted device has received the second data via the communication bus, a state of the second vehicle-mounted device transitions to a high power state whose power consumption is larger than the power consumption in the low power state, and the processing unit instructs transmission of the first data via the communication bus to cause the state of the first vehicle-mounted device to transition to the high power state, and instructs transmission of the second data via the communication bus to cause the states of the first vehicle-mounted device and the second vehicle-mounted device to transition to the high power state.

One aspect of a vehicle-mounted system according to the present disclosure includes at least two of the first vehicle-mounted device.

In one aspect of a vehicle-mounted system according to the present disclosure, a maximum value of power consumed by each first vehicle-mounted device is below a maximum value of power consumed by the second vehicle-mounted device.

One aspect of a vehicle-mounted system according to the present disclosure further includes a third vehicle-mounted device to which power is supplied via a switch, wherein when the switch has switched from off to on, a state of the third vehicle-mounted device transitions from a low power state where power consumption is low to a high power state whose power consumption is larger than the power consumption in the low power state, and the processing unit instructs switching of the switch to on to cause the state of the third vehicle-mounted device to transition to the high power state.

One aspect of a vehicle-mounted system according to the present disclosure includes at least two of the third vehicle-mounted device, wherein power is supplied to the plurality of third vehicle-mounted devices via the switch which is shared.

In one aspect of a vehicle-mounted system according to the present disclosure, a dark current of each first vehicle-mounted device or the second vehicle-mounted device is below a dark current of each third vehicle-mounted device.

In one aspect of a vehicle-mounted system according to the present disclosure, the third vehicle-mounted devices are not connected to the communication bus.

In one aspect of a vehicle-mounted system according to the present disclosure, when execution of one vehicle operation out of a plurality of vehicle operations relating to a vehicle has been indicated, the processing unit causes a state of every vehicle-mounted device, out of a plurality of vehicle-mounted devices which include the first vehicle-mounted device and the second vehicle-mounted device and which transition to a low power state where power consumption is low or to a high power state whose power consumption is larger than the power consumption in the low power state, that is necessary to realize the vehicle operation whose execution has been indicated to transition to the high power state.

In one aspect of a vehicle-mounted system according to the present disclosure, when a number of vehicle operations being executed out of the plurality of vehicle operations has fallen, the processing unit causes a state of a vehicle-mounted device that is unnecessary to realize the vehicle operations being executed to transition to the low power state.

One aspect of a vehicle-mounted system according to the present disclosure further includes a receiving unit for receiving data whose transmission destination is one out of a plurality of vehicle-mounted devices, which include the first vehicle-mounted device and the second vehicle-mounted device and which transition to a low power state where power consumption is low or to a high power state whose power consumption is larger than the power consumption in the low power state, wherein when the receiving unit has received the data, the processing unit determines whether a state of the transmission destination of the data received by the receiving unit is the low power state.

A management device according to one aspect of the present disclosure is a management device that manages power consumption in a vehicle-mounted system that includes a first vehicle-mounted device and a second vehicle-mounted device that are connected to a communication bus, wherein when, in a low-power state where power consumption is low, the first vehicle-mounted device has received first data or second data via the communication bus, a state of the first vehicle-mounted device transitions to a high power state whose power consumption is larger than the power consumption in the low power state, when, in a low-power state where power consumption is low, the second vehicle-mounted device has received the first data via the communication bus, a state of the second vehicle-mounted device is maintained in the low power state, and when, in the low-power state, the second vehicle-mounted device has received the second data via the communication bus, a state of the second vehicle-mounted device transitions to a high power state whose power consumption is larger than the power consumption in the low power state, wherein the management device includes a processing unit for executing processing, and the processing unit instructs transmission of the first data via the communication bus to cause the state of the first vehicle-mounted device to transition to the high power state while keeping the second vehicle-mounted device in the low power state, and instructs transmission of the second data via the communication bus to cause the states of the first vehicle-mounted device and the second vehicle-mounted device to transition from the low power state to the high power state.

A management method according to one aspect of the present disclosure is a management method that manages power consumption in a vehicle-mounted system that includes a first vehicle-mounted device and a second vehicle-mounted device that are connected to a communication bus, wherein when, in a low-power state where power consumption is low, the first vehicle-mounted device has received first data or second data via the communication bus, a state of the first vehicle-mounted device transitions to a high power state whose power consumption is larger than the power consumption in the low power state, when, in a low-power state where power consumption is low, the second vehicle-mounted device has received the first data via the communication bus, a state of the second vehicle-mounted device is maintained in the low power state, and when, in the low-power state, the second vehicle-mounted device has received the second data via the communication bus, a state of the second vehicle-mounted device transitions to a high power state whose power consumption is larger than the power consumption in the low power state, the management method causing a computer to execute: a step of instructing transmission of the first data via the communication bus to cause the state of the first vehicle-mounted device to transition to the high power state while keeping the second vehicle-mounted device in the low power state; and a step of instructing transmission of the second data via the communication bus to cause the states of the first vehicle-mounted device and the second vehicle-mounted device to transition from the low power state to the high power state.

With the vehicle-mounted system, management device, and management method according to the aspects described above, when a vehicle operation for which operation of the second vehicle-mounted device is unnecessary is performed, the first data is transmitted via the communication bus. By doing so, it is possible to cause a transition in the state of the first vehicle-mounted device to the high power state while maintaining the state of the second vehicle-mounted device in the low-power state. As a result, low power consumption can be realized.

In the vehicle-mounted system according to the aspect described above, it is possible to cause the state of the plurality of first vehicle-mounted devices to transition to the high-power state while keeping the state of the second vehicle-mounted device in the low-power state. By transmitting the second data, it is possible to cause the states of the plurality of first vehicle-mounted devices to transition to the high power state.

In the vehicle-mounted system according to the aspect described above, a device whose maximum consumed power is low is used as the first vehicle-mounted device. A device whose maximum consumed power is high is used as the second vehicle-mounted device. The power consumed by a device is expressed, for example, as the product of the length of time the device is operating during a certain predetermined period and the power consumption of the device.

In the vehicle-mounted system according to the aspect described above, it is possible to cause the state of the third vehicle-mounted device to transition to the high power state by switching on the switch. When the switch is off, the power consumption of the third vehicle-mounted device is 0 W.

In the vehicle-mounted system according to the above aspect, it is possible to cause the states of the plurality of third vehicle-mounted devices to transition to the high power state by switching on the switch.

In the vehicle-mounted system according to the aspect described above, a device with a small dark current is used as the first vehicle-mounted device or the second vehicle-mounted device. A device with a large dark current is used as the third vehicle-mounted device.

In the vehicle-mounted system according to the aspect described above, the third vehicle-mounted devices are devices that are not connected to the communication bus.

In the vehicle-mounted system according to the aspect described above, when execution of a vehicle operation has been indicated, the state of every vehicle-mounted device necessary for realizing the indicated operation is caused to transition to a high power state.

In the vehicle-mounted system according to the aspect described above, when the number of mid-execution vehicle operations falls, the state of a vehicle-mounted device that is unnecessary for realizing the vehicle operations being executed is caused to transition to the low power state. This makes it possible to realize even lower power consumption.

In the vehicle-mounted system according to the aspect described above, when data has been received, it is determined whether the state of the data transmission destination is in a low power state. By doing so, it is possible to detect whether the data has been stored at the transmission destination.

Preferred embodiments of a vehicle-mounted system according to the present disclosure will now be described in detail with reference to the attached drawings. Note that the present disclosure is not limited to the illustrated examples and is instead indicated by the range of the patent claims and intended to include all possible changes within the meaning and scope of the patent claims and their equivalents.

First Embodiment

Configuration of Vehicle-Mounted System

FIG. 1 is a block diagram depicting the configuration of a principal part of a vehicle-mounted system 1 according to a first embodiment. The vehicle-mounted system 1 is installed in a vehicle C. The vehicle-mounted system 1 includes a DC power supply 10, two first ECUs 11, a second ECU 12, two third ECUs 13, a fourth ECU 14, three fifth ECUs 15, switches 16 and 17, driving circuits 18 and 19, a management device 20, and communication buses Ba and Bb. The DC power supply 10 is a battery, for example. In this specification, "ECU" is an abbreviation for "Electronic Control Unit". In FIG. 1, connection lines related to the supplying of power are drawn as thick lines. Other connection lines are drawn as thin lines. Each of the first ECUs 11, the second ECU 12, the third ECUs 13, the fourth ECU 14, and the fifth ECUs 15 functions as a vehicle-mounted device.

The negative electrode of the DC power supply 10 is grounded. This grounding is achieved by connecting to the body of the vehicle C, for example. The positive electrode of the DC power supply 10 is connected to the two first ECUs 11, the second ECU 12, the three fifth ECUs 15, one end of the switch 16, and one end of the switch 17. The other end of the switch 16 is connected to the two third ECUs 13. The other end of the switch 17 is connected to the fourth ECU 14. The two first ECUs 11, the second ECU 12, the two third ECUs 13, the fourth ECU 14, and the three fifth ECUs 15 are all grounded.

The driving circuits 18 and 19 are separately connected to the management device 20. The two first ECUs 11, the second ECU 12, and the management device 20 are each connected to a communication bus Ba. The first ECUs 11 and the second ECU 12 function as first vehicle-mounted devices and a second vehicle-mounted device, respectively. The three fifth ECUs 15 and the management device 20 are each connected to a communication bus Bb. None of the third ECUs 13 and the fourth ECU 14 are connected to either of the communication buses connected to the management device 20, that is, the two communication buses Ba and Bb.

A current flows from the positive electrode of the DC power supply 10 through each of the two first ECUs 11, the second ECU 12, and the three fifth ECUs 15. The currents outputted from each of the two first ECUs 11, the second ECU 12, and the three fifth ECUs 15 flow to the negative electrode of the DC power supply 10. By doing so, electric power is supplied to each of the two first ECUs 11, the second ECU 12, and the three fifth ECUs 15. The respective states of the first ECUs 11, the second ECU 12, and the fifth ECUs 15 are a high power state, where power consumption is high, or a low power state, where power consumption is low. The power consumption in the high power state is greater than the power consumption in the low power state. The power consumption of a device is the power consumed by the device during operations. The unit of power consumption is watts [W].

When the respective states of the first ECUs 11, the second ECU 12, and the fifth ECUs 15 are all the low power state, the power consumption exceeds OW. The low power state of the first ECUs 11, the second ECU 12, and the fifth ECUs 15 is a so-called "sleep state". The high power state of the first ECUs 11, the second ECU 12, and the fifth ECUs 15 is a so-called "wake-up state".

The management device 20 outputs a high level voltage or a low level voltage to the driving circuit 18. When the voltage that the management device 20 outputs to the driving circuit 18 has switched from a low level to a high level voltage, the driving circuit 18 switches on the switch 16. When the voltage that the management device 20 outputs to the driving circuit 18 has switched from a high level to a low level voltage, the driving circuit 18 switches off the switch.

When the switch 16 is on, a current flows from the positive electrode of the DC power supply 10 through the switch 16. The current outputted from the switch 16 flows through the two third ECUs 13. The currents outputted from the two third ECUs 13 flow to the negative electrode of the DC power supply 10. By doing so, power is supplied to the two third ECUs 13 via the switch 16. The third ECUs 13 function as third vehicle-mounted devices. When the switch 16 is off, no current flows through the switch 16. This means that the flow of current through the two third ECUs 13 stops. As a result, the supplying of power to the third ECUs 13 stops.

When the switch 16 is on, the respective states of the two third ECUs 13 are a high power state where power consumption is high. When the switch 16 is off, the respective states of the two third ECUs 13 are a low power state where power consumption is low. The power consumption of a third ECU 13 in the low power state is 0 W. The power consumption in the high power state is larger than the power consumption in the low power state. When the switch 16 has switched from off to on, the states of the two third ECUs 13 transition from the low power state to the high power state. When the switch 16 has switched from on to off, the state of the third ECUs 13 transition from the high power state to the low power state.

In the same way, the management device 20 outputs a high level voltage or a low level voltage to the driving circuit 19. When the voltage that the management device 20 outputs to the driving circuit 19 has switched from a low level to a high level voltage, the driving circuit 19 switches on the switch 17. When the voltage that the management device 20 outputs to the driving circuit 19 has switched from the high level to a low level voltage, the driving circuit 19 switches off the switch.

When the switch 17 is on, a current flows from the positive electrode of the DC power supply 10 via the switch 17. The current outputted from the switch 17 flows through the fourth ECU 14. The current outputted from the fourth ECU 14 flows to the negative electrode of the DC power supply 10. By doing so, power is supplied via the switch 17 to the fourth ECU 14. The fourth ECU 14 also functions as a third vehicle-mounted device. When the switch 17 is off, no current flows through the switch 17. This means that the flow of current via the fourth ECU 14 stops. As a result, the supplying of power to the fourth ECU 14 stops.

When the switch 17 is on, the state of the fourth ECU 14 is a high power state where power consumption is high. When the switch 17 is off, the state of the fourth ECU 14 is a low power state where power consumption is low. The power consumption of the fourth ECU 14 in the low power state is 0 W. The power consumption in the high power state is greater than the power consumption in the low power state. When the switch 17 has switched from off to on, the state of the fourth ECU 14 transitions from the low power state to the high power state. When the switch 17 has switched from on to off, the state of the fourth ECU 14 transitions from the high power state to the low power state.

Data transmitted via the communication bus Ba is received by every device connected to the communication bus Ba. In the same way, data transmitted via the communication bus Bb is received by every device connected to the communication bus Bb.

The management device 20 transmits first activation data, second activation data, first suspension data, and second suspension data via the communication bus Ba to the two first ECUs 11 and the second ECU 12. When the first ECUs 11 in the low power state receive data via the communication bus Ba, the state of each first ECU 11 transitions from the low power state to the high power state.

The data for causing a transition in the state of the first ECU 11 from the low power state to the high power state may be any data. Accordingly, when a first ECU 11 in the low power state has received the first activation data, the second activation data, the first suspension data, or second suspension data via the communication bus Ba, the state of that first ECU 11 transitions from the low power state to the high power state.

When the second ECU 12 in the low power state has received the second activation data via the communication bus Ba, the state of the second ECU 12 transitions from the low power state to the high power state. When the second ECU 12 in the low power state receives data aside from the second activation data via the communication bus Ba, the state of the second ECU 12 is maintained in the low power state. Here, the "data aside from the second activation data" includes the first activation data, the first suspension data, and the second suspension data. A function where the state transitions from a low power state to a high power state only when the second activation data has been received is called a "partial function".

When the first ECUs 11 in the high power state have received the first suspension data via the communication bus Ba, the states of the first ECUs 11 transition from the high power state to the low power state. When the first ECUs 11 have received data aside from the first suspension data via the communication bus Ba in the high power state, the states of the first ECUs 11 are maintained in the high power state.

When the second ECU 12 in the high power state has received the second suspension data via the communication bus Ba, the state of the second ECU 12 transitions from the high power state to the low power state. When the second ECU 12 in the high power state has received data aside from the second suspension data via the communication bus Ba, the state of the second ECU 12 is maintained in the high power state.

The management device 20 transmits activation data and suspension data via the communication bus Bb to the three fifth ECUs 15. When the fifth ECUs 15 in the low power state have received data via the communication bus Bb, the states of the fifth ECUs 15 transition from the low power state to the high power state. The data for causing a transition in the states of the fifth ECUs 15 from the low power state to the high power state may be any data. Accordingly, when the fifth ECUs 15 in the low power state have received activation data or suspension data via the communication bus Ba, the states of the fifth ECUs 15 transition from the low power state to the high power state.

When the fifth ECUs 15 in the high power state have received suspension data via the communication bus Bb, the states of the fifth ECUs 15 transition from the high power state to the low power state. When the fifth ECUs 15 in the high power state have received data aside from suspension data via the communication bus Bb, the states of the fifth ECUs 15 are maintained in the high power state.

Figures 2, 3:
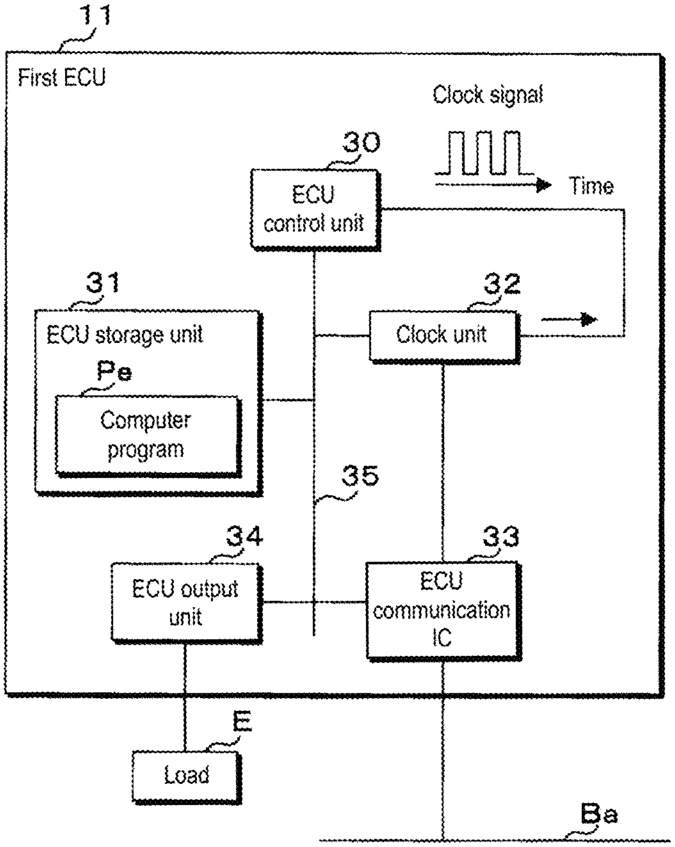
FIG. 2 is a table indicating targets whose states are managed by a management device.
FIG. 3 is a block diagram depicting the configuration of a principal part of a first ECU.

FIG. 2 is a table indicating targets whose states are managed by the management device 20. The first target is one or a plurality of ECUs whose state transitions from a low power state to a high power state when the management device 20 transmits the first activation data via the communication bus Ba. Accordingly, the first target is the two first ECUs 11. The management device 20 transmits the first suspension data via the communication bus Ba. By doing so, the state of the first target transitions from the high power state to the low power state.

The second target is one or a plurality of ECUs whose state transitions from the low power state to the high power state when the management device 20 transmits the second activation data via the communication bus Ba. Accordingly, the second target is the two first ECUs 11 and the second ECU 12. The management device 20 transmits the second suspension data via the communication bus Ba. After transmitting the second suspension data, the management device 20 transmits the first suspension data via the communication bus Ba. As a result, the state of the second target transitions from the high power state to the low power state.

The third target is one or a plurality of ECUs whose state transitions from the low power state to the high power state when the switch 16 is switched from off to on. Accordingly, the third target is the two third ECUs 13. The management device 20 causes the driving circuit 18 to switch the switch 16 from on to off. By doing so, the state of the third target changes from the high power state to the low power state.

The fourth target is one or a plurality of ECUs whose state transitions from the low power state to the high power state when the switch 16 is switched from off to on. Accordingly, the fourth target is the fourth ECU 14. The management device 20 causes the driving circuit 19 to switch the switch 17 from on to off. By doing so, the state of the fourth target changes from the high power state to the low power state.

The fifth target is one or a plurality of ECUs whose state transitions from a low power state to a high power state when the management device 20 transmits activation data via the communication bus Bb. Accordingly, the fifth target is the three fifth ECUs 15. The management device 20 transmits the suspension data via the communication bus Bb. By doing so, the state of the fifth target transitions from the high power state to the low power state.

Figure 5:
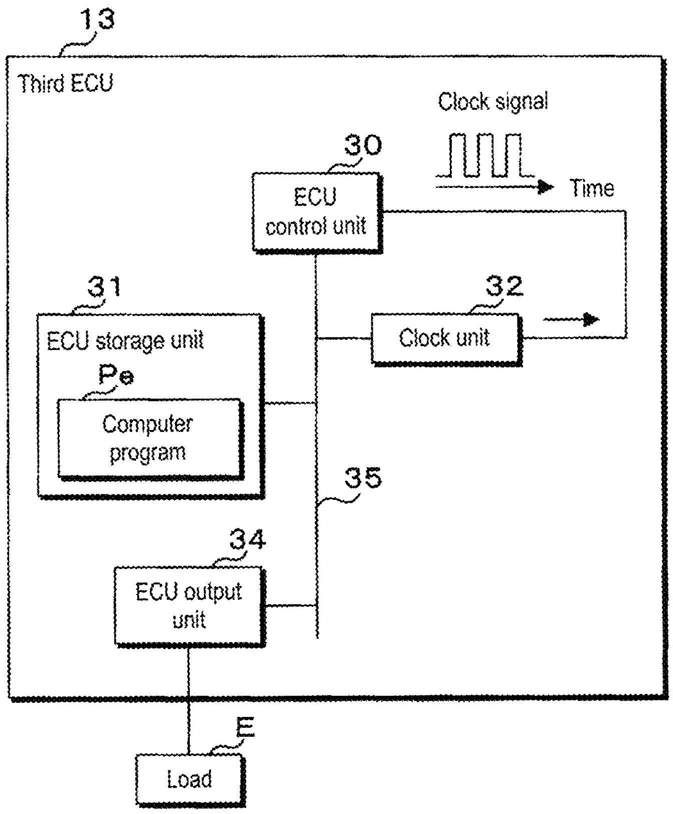
FIG. 5 is a block diagram depicting the configuration of a principal part of a third ECU.

The two first ECUs 11, the second ECU 12, the two third ECUs 13, the fourth ECU 14, and the three fifth ECUs 15 each control the operation of a load E (see FIG. 3 or FIG. 5). Each load E is an electrical device installed in the vehicle C. Execution of vehicle operations relating to the vehicle C is performed according to instructions. One or a plurality of ECUs out of a plurality of ECUs including the two first ECUs 11, the second ECU 12, the two third ECUs 13, the fourth ECU 14, and the three fifth ECUs 15 control the operations of one or a plurality of loads E. By doing so, vehicle operations whose execution has been indicated by instructions are realized.

A plurality of vehicle operations are performed. This plurality of vehicle operations include locking and unlocking of doors, opening and closing of windows, replaying videos, and turning on and off of an air conditioner. An instruction to execute one vehicle operation out of the plurality of vehicle operations is inputted into the management device 20. The management device 20 causes the state of every ECU, out of the two first ECUs 11, the second ECU 12, the two third ECUs 13, the fourth ECU 14, and the three fifth ECUs 15, that is necessary to realize the vehicle operation whose execution has been indicated to transition to the high power state. When the number of vehicle operations being executed decreases, the management device 20 causes the states of ECUs, out of the two first ECUs 11, the second ECU 12, the two third ECUs 13, the fourth ECU 14, and the three fifth ECUs 15, that are unnecessary to realize the vehicle operations that are mid-execution to transition to the low power state.

Configuration of First ECUs 11

FIG. 3 is a block diagram depicting the configuration of a principal part of a first ECU 11. A first ECU 11 includes an ECU control unit 30, an ECU storage unit 31, a clock unit 32, an ECU communication IC 33, and an ECU output unit 34. Here, "IC" is an abbreviation for "Integrated Circuit". The ECU control unit 30, the ECU storage unit 31, the clock unit 32, the ECU communication IC 33, and the ECU output unit 34 are connected to an internal bus 35. Each of the ECU control unit 30 and the ECU communication IC 33 is also connected directly to the clock unit 32. The ECU output unit 34 is also connected to a load E.

As one example, the ECU storage unit 31 includes volatile memory and nonvolatile memory. The ECU storage unit 31 stores a computer program Pe. The ECU control unit 30 includes a processing element, such as a CPU (Central Processing Unit), that executes processing. A processing element of the ECU control unit 30 executes various processes by executing the computer program Pe.

The clock unit 32 outputs a clock signal to the ECU control unit 30. The voltage indicated by the clock signal periodically rises from a low level voltage to a high level voltage. The ECU control unit 30 executes processing every time the voltage indicated by the clock signal rises. Accordingly, the shorter the cycle of rises in the clock signal, the greater the number of processes executed per unit time. The greater the number of processes executed per unit time, the larger the power consumption of the first ECU 11.

The ECU communication IC 33 receives the first activation data, the second activation data, the first suspension data, and the second suspension data via the communication bus Ba. The ECU output unit 34 outputs an operation signal indicating an operation of the load E in keeping with an instruction from the ECU control unit 30. The load E executes the operation indicated by the operation signal inputted from the outside.

Figure 4:
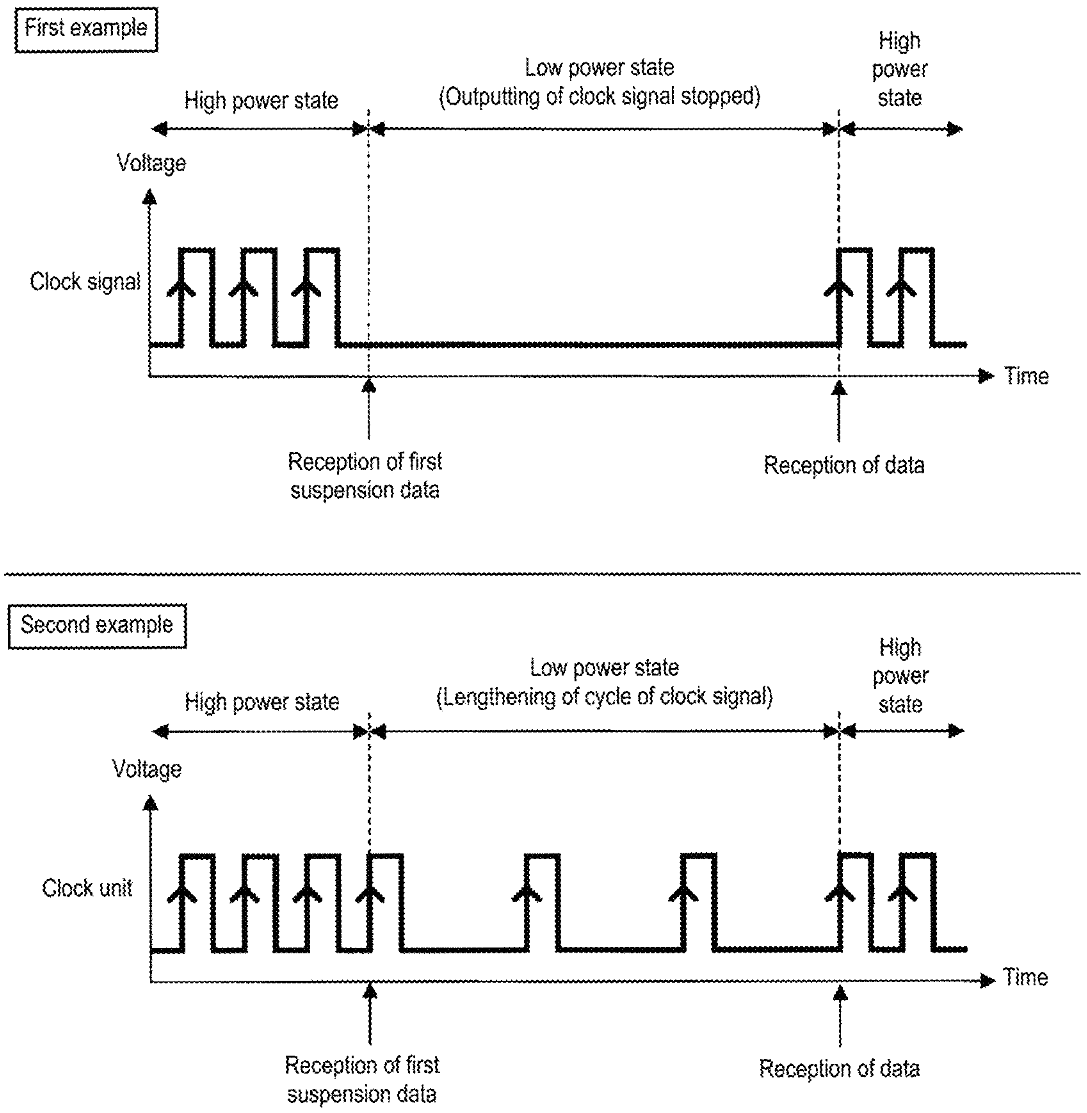
FIG. 4 is a diagram for describing a method for realizing a low power state.

FIG. 4 is a diagram for describing a method for realizing a low power state. FIG. 4 depicts a first example and a second example of a method for realizing a low power state. FIG. 4 depicts transitions in the voltage indicated by the clock signal. For these transitions, time is indicated on the horizontal axis. When the state of a first ECU 11 is the high power state, the voltage of the clock signal rises every time a predetermined period elapses.

First, the first example of a method for realizing a low power state will be described. When the state of the first ECU 11 is the high power state and the ECU communication IC 33 has received the first suspension data, the ECU control unit 30 instructs the clock unit 32 to stop outputting the clock signal. By doing so, the voltage of the clock signal is fixed at a low level voltage. As a result, the ECU control unit 30 does not execute any processing, and the power consumption of the first ECU 11 falls. The state of the first ECU 11 transitions from the high power state to the low power state.

When the state of a first ECU 11 is the low power state and the ECU communication IC 33 has received data, the ECU communication IC 33 instructs the clock unit 32 to output the clock signal. In response, the clock unit 32 resumes the outputting of the clock signal, and the state of the first ECU 11 transitions from the low power state to the high power state. As described earlier, the data for causing a transition in the state of the first ECU 11 from the low power state to the high power state may be any data.

Next, the second example of a method for realizing a low power state will be described. When the first ECU 11 is in the high power state and the ECU communication IC 33 has received the first suspension data, the ECU control unit 30 instructs the clock unit 32 to lengthen the cycle of rises in the clock signal to a fixed cycle that is longer than the predetermined cycle. As a result, the number of processes executed by the ECU control unit 30 per unit time falls and the power consumption of the first ECU 11 falls. The state of the first ECU 11 transitions from the high power state to the low power state.

When the state of the first ECU 11 is the low power state and the ECU communication IC 33 has received data, the ECU communication IC 33 instructs the clock unit 32 to restore the cycle of rises in the clock signal to the predetermined cycle. By doing so, the state of the first ECU 11 transitions from the low power state to the high power state. As described earlier, the data for causing a transition in the state of the first ECU 11 from the low power state to the high power state may be any data.

Configuration of Second ECU 12

The second ECU 12 has a similar configuration to the first ECUs 11. When the state of the second ECU 12 is the high power state and the ECU communication IC 33 has received the second suspension data, the ECU control unit 30 causes the state of the second ECU 12 to transition from the high power state to the low power state. As described earlier, the transition to the low power state is realized by stopping the output of the clock signal or by lengthening the cycle of rises in the clock signal.

When the state of the second ECU 12 is the low power state and the ECU communication IC 33 has received the second activation data, the ECU communication IC 33 causes the state of the second ECU 12 to transition from the low power state to the high power state. As described earlier, the ECU communication IC 33 causes the clock unit 32 to resume outputting of the clock signal or instructs the clock unit 32 to restore the cycle of rises in the clock signal to the predetermined cycle, thereby realizing a transition to the high power state.

Configuration of Third ECUs 13

FIG. 5 is a block diagram depicting the configuration of a principal part of a third ECU 13. In the same way as the first ECUs 11, each third ECU 13 includes an ECU control unit 30, an ECU storage unit 31, a clock unit 32, and an ECU output unit 34. The ECU control unit 30, the ECU storage unit 31, the clock unit 32, and the ECU output unit 34 of each third ECU 13 operate in the same way as the ECU control unit 30, the ECU storage unit 31, the clock unit 32, and the ECU output unit 34 of the first ECU 11.

As described earlier, when the switch 16 is on, the DC power supply 10 supplies power to the third ECUs 13. While power is being supplied to a third ECU 13, the clock unit 32 outputs the clock signal. Each time the voltage of the clock signal rises, the ECU control unit 30 executes processing. When the switch 16 is on, the state of the third ECUs 13 is the high power state.

When the switch 16 is off, the supplying of power from the DC power supply 10 to the third ECUs 13 stops. Accordingly, the ECU control unit 30, the ECU storage unit 31, the clock unit 32, and the ECU output unit 34 of each third ECU 13 stop operating. When the switch 16 is off, the state of the third ECUs 13 is the low power state.

Configuration of Fourth ECU 14

The fourth ECU 14 has a similar configuration to the third ECUs 13. When the switch 17 is on, the state of the fourth ECU 14 is the high power state. When the switch 17 is off, the state of the fourth ECU 14 is the low power state.

Configuration of Fifth ECUs 15

The fifth ECUs 15 have a similar configuration to the first ECUs 11. The ECU communication IC 33 receives activation data and suspension data via the communication bus Bb. When the state of a fifth ECU 15 is the high power state and the ECU communication IC 33 has received the suspension data, the ECU control unit 30 causes the state of the fifth ECU 15 to transition from the high power state to the low power state.

When the state of the fifth ECU 15 is the low power state and the ECU communication IC 33 has received data, the ECU communication IC 33 causes the state of the fifth ECU 15 to transition from the low power state to the high power state. As described earlier, the data for causing the state of the fifth ECU 15 to transition from the low power state to the high power state may be any data.

Configuration of Management Device 20

Figure 6:
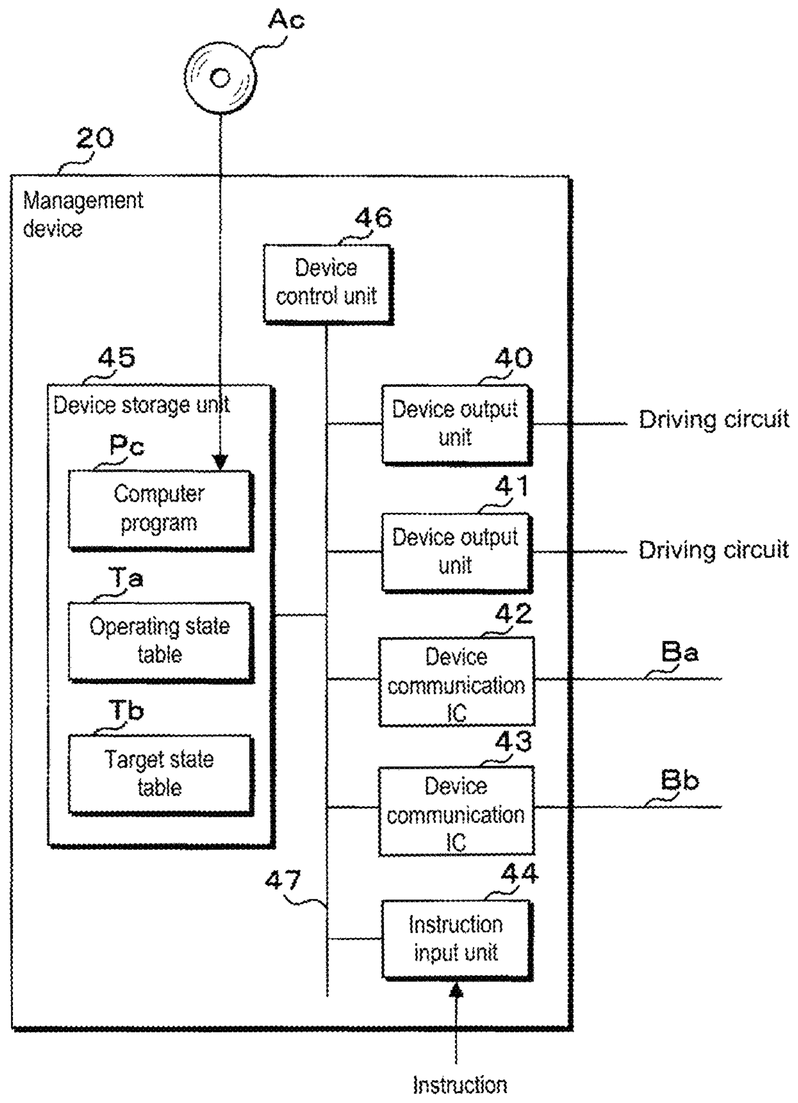
FIG. 6 is a block diagram depicting the configuration of a principal part of the management device.

FIG. 6 is a block diagram depicting the configuration of a principal part of the management device 20. The management device 20 includes device output units 40 and 41, device communication ICs 42 and 43, an instruction input unit 44, a device storage unit 45, and a device control unit 46. These elements are connected to an internal bus 47. The device output units 40 and 41 are also connected to the driving circuits 18 and 19, respectively. The device communication ICs 42 and 43 are also connected to the communication buses Ba and Bb, respectively.

The device output unit 40 outputs a high level voltage or a low level voltage to the driving circuit 18. The output voltage of the device output unit 40 is the voltage that the management device 20 is outputting to the driving circuit 18. The device output unit 40 switches the output voltage of the driving circuit 18 to a high level voltage or a low level voltage according to an instruction from the device control unit 46. The driving circuit 18 switches the switch 16 on or off in keeping with the output voltage of the device output unit 40.

In the same way, the device output unit 41 outputs a high level voltage or a low level voltage to the driving circuit 19. The output voltage of the device output unit 41 is the voltage that the management device 20 is outputting to the driving circuit 19. The device output unit 41 switches the output voltage of the driving circuit 19 to a high level voltage or a low level voltage according to an instruction from the device control unit 46. The driving circuit 19 switches the switch 17 on or off in keeping with the output voltage of the device output unit 41.

In keeping with an instruction from the device control unit 46, the device communication IC 42 transmits the first activation data, the second activation data, the first suspension data, and the second suspension data to the two first ECUs 11 and the second ECU 12 via the communication bus Ba. According to an instruction from the device control unit 46, the device communication IC 43 transmits activation data and suspension data via the communication bus Bb to the three fifth ECUs 15. The instruction input unit 44 receives an input of an instruction to execute one vehicle operation out of a plurality of vehicle operations.

As one example, the device storage unit 45 is composed of nonvolatile memory and volatile memory. The device storage unit 45 stores a computer program Pc. The device control unit 46 includes a processing element, such as a CPU, which executes processing. The device control unit 46 functions as a processing unit. By executing the computer program Pc, the device control unit 46 executes processing, such as state transition processing for causing a transition in the state of the first target, the second target, the third target, the fourth target, or the fifth target to a low power state or a high power state Note that the computer program Pc may be provided by a non-transitory storage medium Ac on which the computer program Pc has been stored so as to be readable by a processing element of the device control unit 46. In this case, the computer program Pc read from the storage medium Ac by a reader device (not illustrated) is written into the device storage unit 45. The storage medium Ac is an optical disc, a flexible disk, a magnetic disk, a magneto-optical disc, a semiconductor memory, or the like. As examples, the optical disc is a CD (Compact Disc)-ROM (Read Only Memory), a DVD (Digital Versatile Disc)-ROM, or a BD (Blu-ray (registered trademark) Disc). The magnetic disk is a hard disk, for example. Alternatively, the computer program Pc may be downloaded from a device, not illustrated, connected to a communication network, not illustrated, and the downloaded computer program Pc may be written into the device storage unit 45.

The number of processing elements included in the device control unit 46 is not limited to one, and may be two or more. In this case, a plurality of processing elements may cooperatively execute the state transition processing and the like according to the computer program Pc.

The device storage unit 45 further stores an operating state table Ta and a target state table Tb. The operating state table Ta indicates whether the state of each of a plurality of vehicle operations is "mid-execution" or is "standing by for execution instruction". The operating state of each vehicle operation indicated in the operating state table Ta is changed by the device control unit 46.

The target state table Tb indicates whether the state of each of the first target, the second target, the third target, the fourth target, and the fifth target is a high power state or a low power state. The states of the first target, the second target, the third target, the fourth target, and the fifth target indicated in the target state table Tb are changed individually by the device control unit 46.

FIG. 7 depicts the contents of the operating state table Ta and the target state table Tb. FIG. 7 depicts an example where instructions to execute the first operation, the second operation, the third operation, and the fourth operation are inputted into the instruction input unit 44. Each of the first operation, the second operation, the third operation, and the fourth operation is a vehicle operation. The operating state table Ta indicates the state of each operation. The state of each operation is "mid-execution" or "standing by for execution instruction".

The operating state table Ta further indicates one or a plurality of targets that are necessary to execute each of the first operation, the second operation, the third operation, and the fourth operation. Each of these targets is one of the first target, second target, third target, fourth target, and fifth target. In the example in FIG. 7, the target that is necessary to execute the first operation is the first target. The targets that are necessary to execute the second operation are the second target and the fourth target.

The target state table Tb indicates the respective states of the first target, the second target, the third target, the fourth target, and the fifth target. Each state indicated in the target state table Tb is the high power state or the low power state. In the target state table Tb, the device control unit 46 changes the states of every target that is necessary to realize one or a plurality of vehicle operations whose execution has been indicated to the high power state, and changes the states of the remaining targets to the low power state. In the example in FIG. 7, the states of the first target, the second target, and the fourth target that are necessary to realize the first operation and the second operation are the high power state. The states of the third target and fifth target are the low power state.

State Transition Processing

Figure 8:
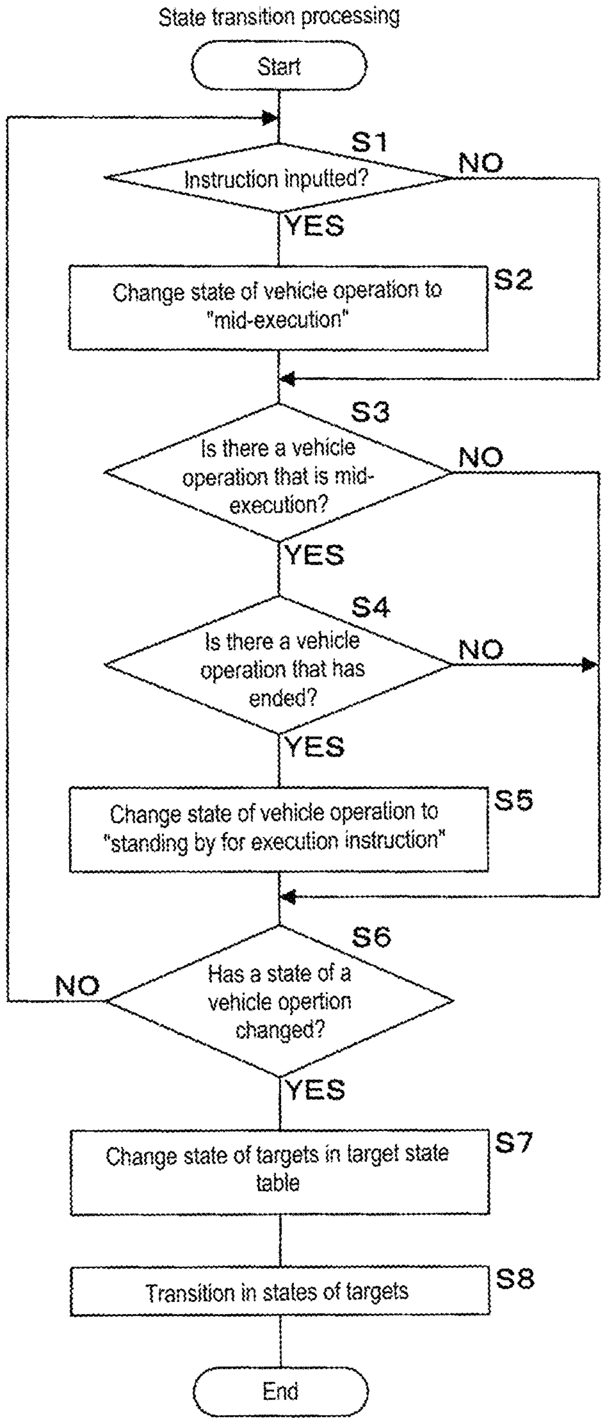
FIG. 8 is a flowchart depicting the procedure of state transition processing.

FIG. 8 is a flowchart depicting the procedure of the state transition processing. In the state transition processing, the device control unit 46 first determines whether an instruction to execute a vehicle operation has been inputted into the instruction input unit 44 (step S1). If it has been determined that an instruction to execute a vehicle operation has been inputted (S1: YES), the device control unit 46 changes the state of the vehicle operation whose execution has been indicated to "mid-execution" in the operating state table Ta (step S2). In the example in FIG. 7, when execution of the third operation has been indicated, the state of the third operation is changed from "standing by for execution instruction" to "mid-execution".

If the device control unit 46 has determined that a vehicle operation instruction has not been inputted (S1: NO), or after step S2 has been executed, the device control unit 46 determines whether there is a vehicle operation that is mid-execution in the operating state table Ta (step S3). When it has been determined that there is a vehicle operation that is mid-execution (S3: YES), the device control unit 46 determines whether there is a vehicle operation that has actually ended (step S4). As one example, the device control unit 46 determines whether a vehicle operation has ended based on whether information indicating the end of the vehicle operation has been inputted from an external device or a sensor into an input unit (not illustrated). When the device control unit 46 has determined that there is a completed vehicle operation (S4: YES), the device control unit 46 changes the state of the completed vehicle operation from "mid-execution" to "standing by for execution instruction" in the operation state table Ta (step S5). In the example in FIG. 7, when the first operation has actually ended, the device control unit 46 changes the state of the first operation from "mid-execution" to "standing by for execution instruction".

When the device control unit 46 has determined that there is no vehicle operation that is mid-execution (S3: NO), or has determined that there is no completed vehicle operation (S4: NO), or after step S5 has been executed, the device control unit 46 determines whether there is at least one vehicle operation whose state has changed in the state transition table Ta (step S6). If it has been determined that the state has changed for none of the vehicle operations (S6: NO), the device control unit 46 executes step S1 again. The device control unit 46 stands by until a vehicle operation is indicated or until at least one vehicle operation ends.

When it has been determined that the state of at least one vehicle operation has changed (S6: YES), the device control unit 46 changes the state of at least one target in the target state table Tb (step S7). In step S7, as described earlier, the device control unit 46 changes the state of every target that is necessary to realize one or more vehicle operations whose execution has been indicated to the high power state in the object state table Tb and changes the states of the remaining targets to the low power state.

Accordingly, when the number of vehicle operations being executed out of the plurality of vehicle operations has decreased, the states of one or a plurality of targets that are unnecessary to realize the one or a plurality of vehicle operations that are mid-execution are caused to transition to the low power state. Each of the one or a plurality of targets referred to here is one of a first target, a second target, a third target, a fourth target, and a fifth target.

After executing step S7, the device control unit 46 causes transitions in the states of at least one target out of the states of the first target, the second target, the third target, the fourth target, and the fifth target to the high power state or the low power state so as to match the states indicated by the target state table Tb (step S8).

The device control unit 46 causes a transition in the state of the first target, that is, the two first ECUs 11, to the high power state by instructing the device communication IC 42 to transmit the first activation data via the communication bus Ba. The device control unit 46 causes a transition in the state of the first target to the low power state by instructing the device communication IC 42 to transmit the first suspension data via the communication bus Ba.

The device control unit 46 causes a transition in the states of the first target and the second target, that is, the two first ECUs 11 and the second ECU 12, to the high power state by instructing the device communication IC 42 to transmit the second activation data via the communication bus Ba. The first activation data and the second activation data correspond to first data and second data, respectively. The device control unit 46 instructs the device communication IC 42 to transmit the second suspension data via the communication bus Ba. After this, the device control unit 46 instructs the device communication IC 42 to transmit the second suspension data via the communication bus Ba. By doing so, the state of the second target transitions to the low power state.

The device control unit 46 causes a transition in the state of the third target, that is, the two third ECUs 13, to the high power state by instructing the driving circuit 18 to switch on the switch 16. The device control unit 46 instructs the driving circuit 18 to switch on the switch 16 by causing the device output unit 40 to switch the output voltage to a high level voltage. The device control unit 46 causes a transition in the state of the third target to the low power state by instructing the driving circuit 18 to switch off the switch 16. The device control unit 46 instructs the driving circuit 18 to switch off the switch 16 by causing the device output unit 40 to switch the output voltage to a low level voltage.

In the same way, the device control unit 46 causes a transition in the state of the fourth target, that is, the fourth ECU 14, to the high power state by instructing the driving circuit 19 to switch on the switch 17. The device control unit 46 instructs the driving circuit 19 to switch on the switch 17 by causing the device output unit 41 to switch the output voltage to a high level voltage. The device control unit 46 causes a transition in the state of the fourth target to the low power state by instructing the driving circuit 19 to switch off the switch 17. The device control unit 46 instructs the driving circuit 19 to switch off the switch 17 by causing the device output unit 41 to switch the output voltage to a low level voltage.

The device control unit 46 causes a transition in the state of the fifth target, that is, the three fifth ECUs 15 to the high power state by instructing the device communication IC 43 to transmit activation data via the communication bus Bb. The device control unit 46 causes a transition in the state of the fifth target to the low power state by instructing the device communication IC 43 to transmit suspension data via the communication bus Bb.

After executing step S8, the device control unit 46 ends the state transition processing. After the state transition processing has ended, the device control unit 46 executes the state transition processing again.

As described above, the device control unit 46 of the management device 20 controls the power consumption of the vehicle-mounted system 1 by controlling the power consumption of the two first ECUs 11, the second ECU 12, the two third ECUs 13, the fourth ECU 14, and the three fifth ECUs 15.

Features of First ECU 11 to Fifth ECU 15

FIG. 9 is a table indicating the features of the first ECU 11 to the fifth ECU 15. A "dark current" is a current that flows through an ECU whose operation has stopped, and is also referred to as a "standby current". Here, the "response time" is the time from when an instruction for the execution of a vehicle operation is given until the operation is performed by that ECU. The "limit on response time?" column indicates whether an upper limit has been determined for the response time.

Electric power is constantly supplied from the DC power supply 10 to each of the first ECUs 11 and the fifth ECUs 15. The period during which the respective states of the first ECUs 11 and the fifth ECUs 15 are in the high power state is long. For this reason, each of the first ECUs 11 and the fifth ECUs 15 is preferably an ECU whose dark current is below a certain current threshold and whose maximum amount of consumed power is less than a certain power amount threshold. However, even if their dark currents are equal to or greater than the current threshold, ECUs whose maximum amount of consumed power is less than this power threshold and have a limit on their response time are used as the first ECUs 11 or the fifth ECUs 15.

As one example, the power consumed by a device is expressed as the product of the length of time the device is operating during a certain predetermined period and the power consumption of that device. As one example, the consumed power is expressed in units of watt hours [Wh].

The second ECU 12 is constantly supplied with power from the DC power supply 10. However, the period during which the second ECU 12 is in the high power state is short. For this reason, it is preferable for the second ECU 12 to be an ECU whose dark current is less than a current threshold and whose maximum amount of consumed power is equal to or greater than the power amount threshold. However, even if its dark current is equal to or greater than the current threshold, an ECU whose maximum power consumption is equal to or greater than the power amount threshold and has a limit on its response time is used as the second ECU 12.

When the switch 16 is off, the flow of current through each third ECU 13 stops. When the switch 17 is off, the flow of current through the fourth ECU 14 stops. For a third ECU 13, the period from the switching of the switch 16 from off to on until a third ECU 13 executes an operation is long. In the same way, for the fourth ECU 14, the period from the switching of the switch 17 from off to on until the fourth ECU 14 executes an operation is long. Accordingly, it is preferable for each of the third ECUs 13 and the fourth ECU 14 to be an ECU whose dark current is equal to or greater than a current threshold and does not have a limit on its response time.

From the above, the maximum value of the power consumed by each of the first ECUs 11 and the fifth ECUs 15 is less than the maximum value of the power consumed by the second ECU 12. When ECUs whose dark currents are less than the current threshold are used as the first ECUs 11, the second ECU 12, and the fifth ECUs 15, the dark currents of the first ECUs 11, the second ECU 12, and the fifth ECUs 15 will be less than the dark currents of the third ECUs 13 and the fourth ECU 14.

Effect of Vehicle-Mounted System 1 and Management Device 20

When performing a vehicle operation for which operation of the second ECU 12 is unnecessary, the device communication IC 42 transmits the first activation data via the communication bus Ba. By doing so, it is possible to maintain the state of the second ECU 12 in the low power state while causing a transition in the states of the two first ECUs 11. As a result, low power consumption can be realized for the vehicle-mounted system 1. As described earlier, when the number of vehicle operations that are mid-execution decreases, the device control unit 46 of the management device 20 causes a transition in the states of one or a plurality of targets that are unnecessary for realizing the vehicle operations that are mid-execution to a low power state. By doing so, it is possible to achieve even lower power consumption for the vehicle-mounted system 1.

Second Embodiment

In the first embodiment, two out of the two first ECUs 11, the second ECU 12, the two third ECUs 13, the fourth ECU 14, and the three fifth ECUs 15 may communicate with each other.

Differences between the second embodiment and the first embodiment are described below. Other configurations aside from those described below are the same as in the first embodiment. For this reason, the same reference numerals as in the first embodiment have been assigned to components that are the same as in the first embodiment, and description of such components is omitted.

Configuration of Vehicle-Mounted System 1

Figure 10:
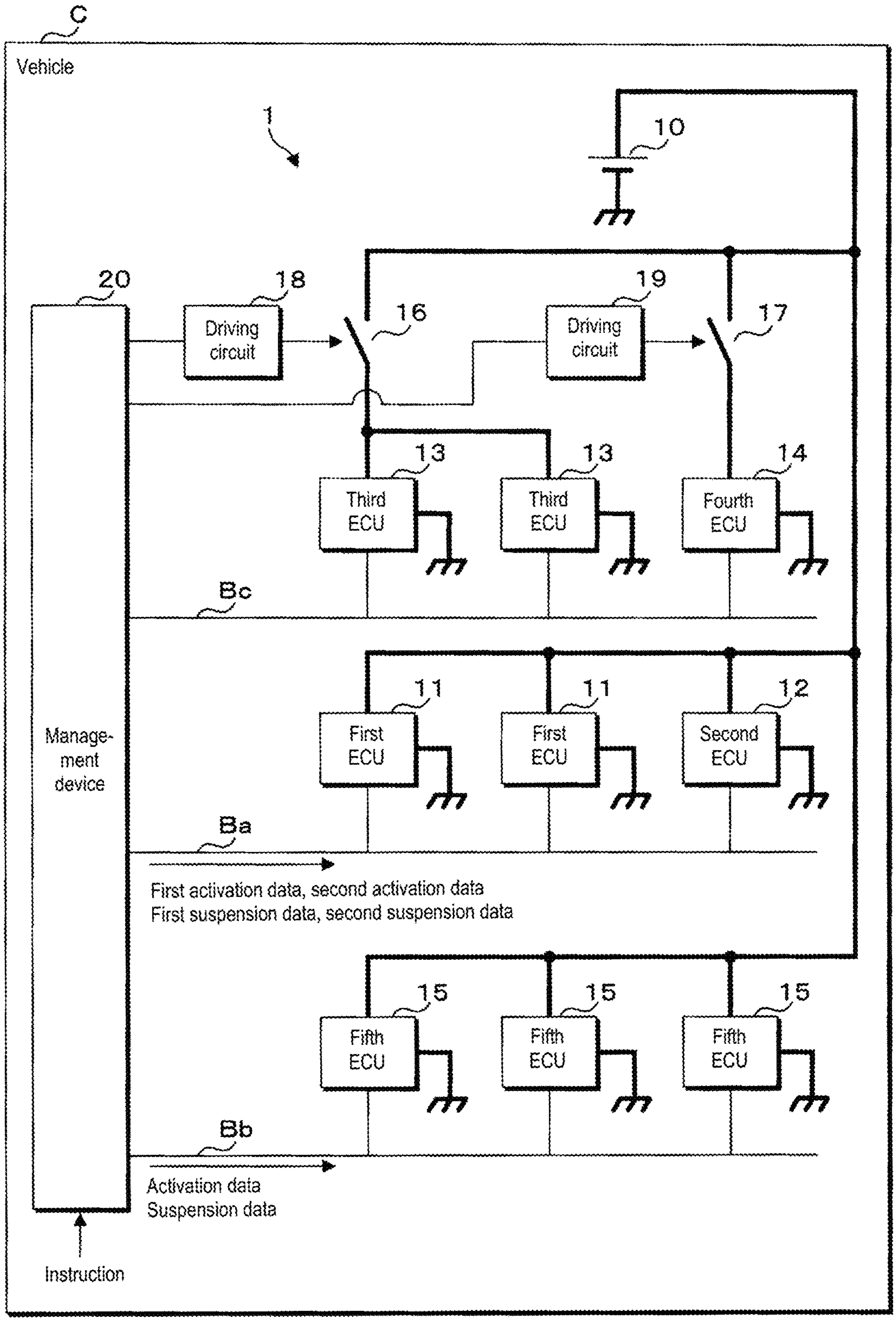
FIG. 10 is a block diagram depicting the configuration of a principal part of a vehicle-mounted system according to a second embodiment.

FIG. 10 is a block diagram depicting the configuration of a principal part of the vehicle-mounted system 1 according to the second embodiment. In the same way as in FIG. 1, in FIG. 10, connection lines related to the supplying of electrical power are drawn as thick lines. Other connection lines are drawn as thin lines. The vehicle-mounted system 1 according to the second embodiment includes a communication bus Bc in addition to the components included in the vehicle-mounted system 1 according to the first embodiment. The communication bus Bc is connected to the two third ECUs 13, the fourth ECU 14, and the management device 20.

Configuration of ECU

In the same way as in the first embodiment, each of the third ECUs 13 and the fourth ECU 14 includes an ECU control unit 30, an ECU storage unit 31, a clock unit 32, and an ECU output unit 34. In the same way as the first ECU 11, each of the third ECUs 13 and the fourth ECU 14 further includes an ECU communication IC 33. In each of the third ECUs 13 and the fourth ECU 14, the ECU communication IC 33 is connected to the internal bus 35 and the communication bus Bc.

In each of the first ECUs 11 and the second ECU 12, the ECU communication IC 33 transmits ECU data, whose transmission destination is one of the two first ECUs 11, the second ECU 12, the two third ECUs 13, the fourth ECU 14, and the three fifth ECUs 15, via the communication bus Ba according to an instruction from the ECU control unit 30. In the same way, in each of the third ECUs 13 and the fourth ECU 14, the ECU communication IC 33 transmits ECU data via the communication bus Bc according to an instruction from the ECU control unit 30. In each fifth ECU 15, the ECU communication IC 33 transmits ECU data via the communication bus Bb according to an instruction from the ECU control unit 30. The ECU data includes transmission destination information indicating the transmission destination.

The ECU communication IC 33 of each of the first ECUs 11 and the second ECU 12 receives data transmitted via the communication bus Ba. The ECU communication IC 33 of each of the third ECUs 13 and the fourth ECU 14 receives data transmitted via the communication bus Bc. The ECU communication IC 33 of each fifth ECU 15 receives data transmitted via the communication bus Bb.

In each of the two first ECUs 11, the second ECU 12, the two third ECUs 13, the fourth ECU 14, and the three fifth ECUs 15, when the ECU communication IC 33 has received ECU data and the transmission destination of the ECU data is that ECU, the ECU control unit 30 writes the ECU data received by the ECU communication IC 33 into the ECU storage unit 31. The ECU control unit 30 determines the operation of the load E, for example, based on this ECU data stored in the ECU storage unit 31.

Configuration of Management Device 20

Figure 11:
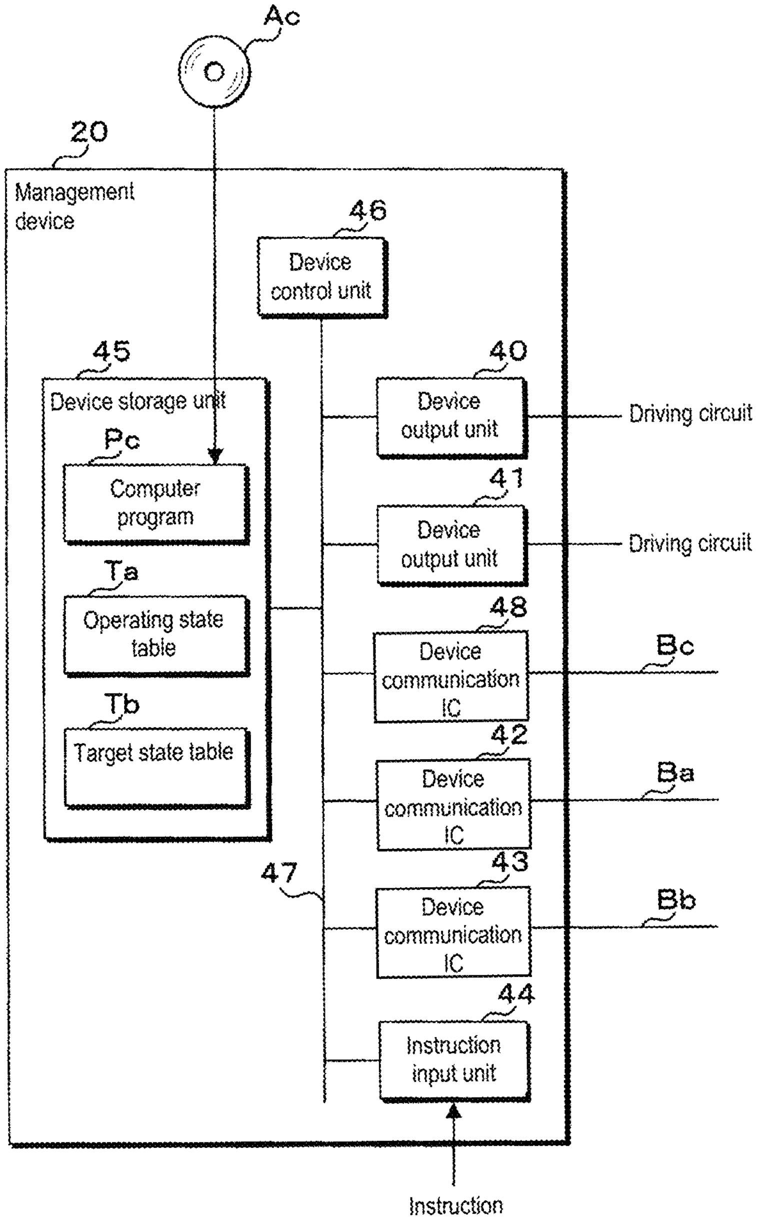
FIG. 11 is a block diagram depicting the configuration of a principal part of a management device.

FIG. 11 is a block diagram depicting the configuration of a principal part of the management device 20. The management device 20 according to the second embodiment includes a device communication IC 48 in addition to the components included in the management device 20 according to the first embodiment. The device communication IC 48 is connected to the internal bus 47 and the communication bus Bc. The device communication ICs 42, 43, and 48 receive ECU data transmitted via the communication buses Ba, Bb, and Bc, respectively. Each of the device communication ICs 42, 43, and 48 functions as a receiving unit. The device communication ICs 42, 43, and 48 transmit ECU data via the communication buses Ba, Bb, and Bc, respectively, according to instructions from the device control unit 46.

By executing the computer program Pc, the device control unit 46 of the management device 20 executes, in addition to the state transition processing, relay processing for relaying data between two ECUs out of the two first ECUs 11, the second ECU 12, the two third ECUs 13, the fourth ECU 14, and the three fifth ECUs 15.

Relay Processing

Figure 12:
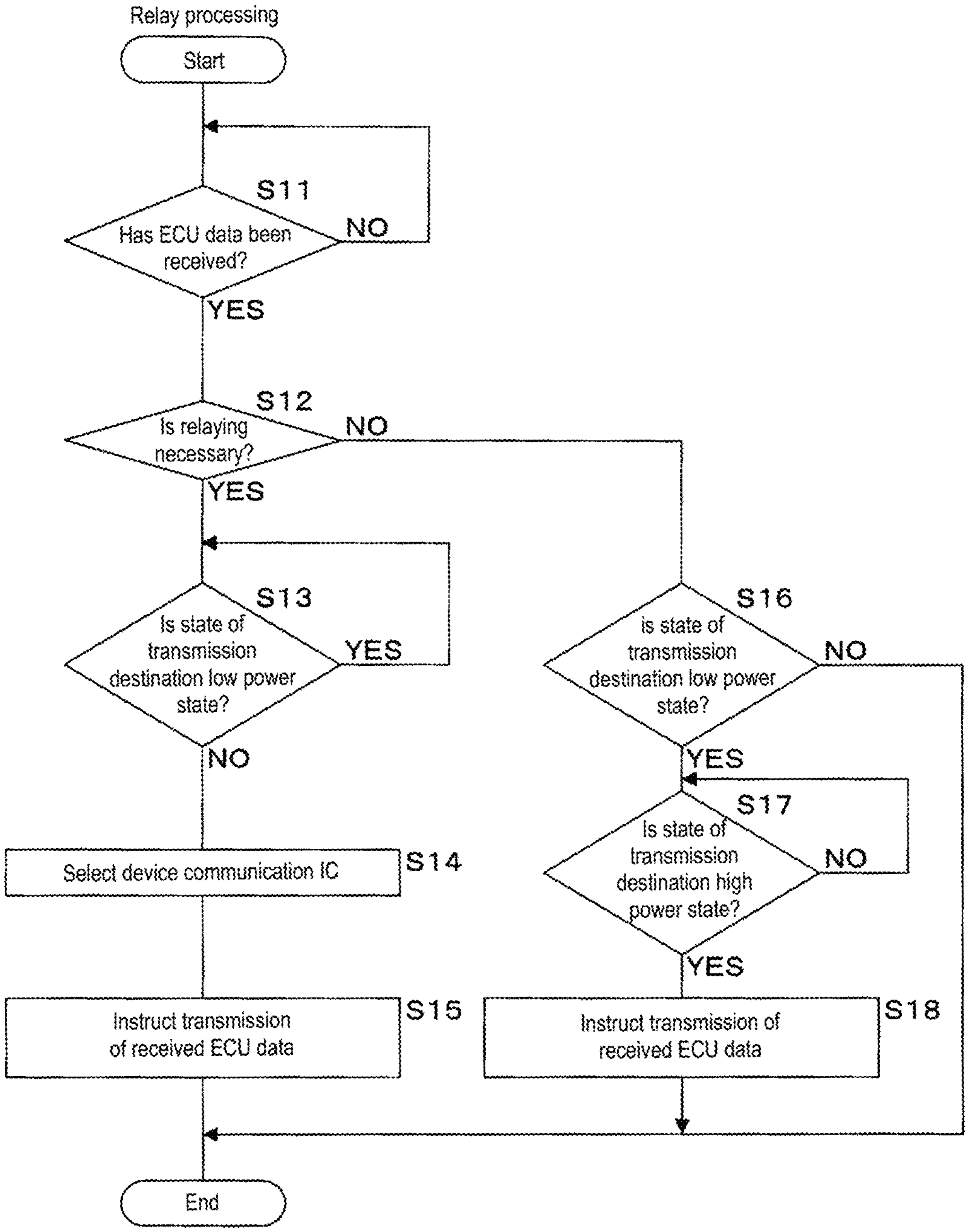
FIG. 12 is a flowchart depicting the procedure of relay processing.

FIG. 12 is a flowchart depicting the procedure of the relay processing. In this relay processing, the device control unit 46 determines whether one of the device communication ICs 42, 43, and 48 has received ECU data (step S11). If the device control unit 46 determines that none of the device communication ICs 42, 43, and 48 has received ECU data (S11: NO), the device control unit 46 executes step S11 again. The device communication IC stands by until one of the device communication ICs 42, 43, and 48 receives ECU data.

When the device control unit 46 has determined that one of the device communication ICs 42, 43, and 48 has received ECU data (S11: YES), the device control unit 46 determines whether it is necessary to relay the received ECU data (step S12). When the transmission destination of ECU data received by the device communication IC 42 is one out of the two third ECUs 13, the fourth ECU 14, and the three fifth ECUs 15, the device control unit 46 determines that relaying is necessary.

In the same way, when the transmission destination of ECU data received by the device communication IC 43 is one out of the two first ECUs 11, the second ECU 12, the two third ECUs 13, and the fourth ECU 14, the device control unit 46 determines that relaying is necessary. When the transmission destination of ECU data received by the device communication IC 48 is one of the two first ECUs 11, the second ECU 12, and the three fifth ECUs 15, the device control unit 46 determines that relaying is necessary.

When it has been determined that relaying is necessary (S12: YES), the device control unit 46 determines whether, in the target state table Tb, the state of the transmission destination of the received ECU data is the low power state (step S13). The received ECU data relates to an instruction to be inputted into the instruction input unit 44 of the management device 20. Accordingly, in the state transition processing, the device control unit 46 causes a transition in the state of the transmission destination of the received ECU data to the high power state. In step S13, if the ECU data has been received before the state of the transmission destination has changed to the high power state, the device control unit 46 determines that the state of the transmission destination is the low power state.

When it has been determined that the state of the transmission destination is the low power state (S13: YES), the device control unit 46 executes step S13 again. The device control unit 46 stands by until the state of the transmission destination changes from the low power state to the high power state in the target state table Tb. When it has been determined that the state of the destination is not the low power state (S13: NO), the device control unit 46 selects the device communication IC that is to transmit the received ECU data out of the three device communication ICs 42, 43, and 48 (step S14). Next, the device control unit 46 instructs the device communication IC selected in step S14 to transmit the received ECU data (step S15). By doing so, the device communication IC selected in step S14 transmits the received ECU data to the transmission destination.

When it has been determined that relaying is not necessary (S12: NO), the device control unit 46 determines whether, in the target state table Tb, the state of the transmission destination of the received ECU data is the low power state (step S16). If the state of the transmission destination is the low power state at the time step S16 was executed, the received ECU data will not be stored in the ECU storage unit 31 of the transmission destination. As described earlier, the state of the transmission destination of the received ECU data transitions to the high power state. Here, the transmission destination being in the low power state means that the transmission of the ECU data was too early.

When it was determined that the state of the transmission destination is the low power state (S16: YES), the device control unit 46 determines whether, in the target state table Tb, the state of the transmission destination of the received ECU data is the high power state (step S17). When it has been determined that the state of the transmission destination is not the high power state (S17: NO), the device control unit 46 executes step S17 again. The device control unit 46 stands by until the state of the transmission destination changes from the low power state to the high power state in the target state table Tb. If it has been determined that the state of the transmission destination is the high power state (S17: YES), the device control unit 46 instructs the device communication IC that received the ECU data to transmit the received ECU data (step S18). By doing so, the ECU data is transmitted to the transmission destination again and is written into the ECU storage unit 31 of the transmission destination.

After executing one of steps S15 and S18, or when it has been determined that the state of the transmission destination is not the low power state (S16: NO), the device control unit 46 ends the relay processing. If the state of the transmission destination is not the low power state, this means that the state of the transmission destination is the high power state. After the relay processing has ended, the device control unit 46 executes the relay processing again.

Features of First ECUs 11 to Fifth ECUs 15

FIG. 13 is a table indicating the features of the first ECUs 11 to the fifth ECUs 15. This second embodiment considers the communication protocols used for data transmission as a feature of the first ECUs 11 to the fifth ECUs 15. The ECUs used as the first ECUs 11, the second ECU 12, and the fifth ECUs 15 are preferably ECUs that use a CAN (Controller Area Network) protocol as the communication protocol. The first ECUs 11, the second ECU 12, and the fifth ECUs 15 are selected based on the dark current, the maximum amount of consumed power, and whether there is a limit on the response time in the same way as in the first embodiment.

It is preferable for each of the third ECUs 13 and the fourth ECU 14 to be an ECU that uses the CAN protocol as the communication protocol, has a dark current equal to or higher than a current threshold, and has no limit on the response time. In addition, an ECU that uses a communication protocol aside from the CAN protocol can be used as the third ECUs 13 or the fourth ECU 14, regardless of the dark current, the maximum power consumption, and limits on response time.

When an ECU that uses a communication protocol aside from the CAN protocol is used as the third ECUs 13 or the fourth ECU 14, the communication protocol used by a third ECU 13 or a fourth ECU 14 will differ from the communication protocol used by the first ECUs 11, the second ECU 12, and the fifth ECUs 15. As an example, the first ECUs 11, the second ECU 12, and the fifth ECUs 15 perform communication according to the CAN protocol. The third ECUs 13 and the fourth ECU 14 communicate according to a LIN (Local Interconnect Network) protocol. In this case, the CAN protocol and the LIN protocol correspond to a "first communication protocol" and a "second communication protocol", respectively.

Note that the first communication protocol used by the first ECUs 11, the second ECU 12, and the fifth ECUs 15 is not limited to the CAN protocol. This is not problematic so long as the second communication protocol used by the third ECUs 13 and the fourth ECU 14 differs from the first communication protocol. Accordingly, the second communication protocol is not limited to the LIN protocol. Aside from the CAN protocol and the LIN protocol, the communication protocols used by the first ECU 11 to the fifth ECU 15 include CAN-FD (Controller Area Network with Flexible Data Rate), Ethernet (registered trademark), CXPI (Clock Extension Peripheral Interface), and FlexRay (registered trademark) protocol.

It is also unnecessary for every third ECU 13 to be connected to the communication bus Bc. This is not problematic so long as at least one third ECU 13 is connected to the communication bus Bc. In addition, the communication bus connected to the third ECUs 13 may differ from the communication bus connected to the fourth ECU 14. In this case, as one example, an ECU that uses the CAN protocol as the communication protocol, has a dark current equal to or higher than the current threshold, and has no limit on response time is used as the third ECU 13, and the fourth ECU 14 uses a communication protocol aside from CAN.

Effects of Vehicle-Mounted System 1 and Management Device 20

The vehicle-mounted system 1 and the management device 20 according to the second embodiment have the same effects as the vehicle-mounted system 1 and the management device 20 according to the first embodiment. With the management device 20 according to the second embodiment, when the device communication IC 42 has received ECU data, the device control unit 46 determines whether the transmission destination of the ECU data is in the low power state. By doing so, the device control unit 46 can detect whether the ECU data has been stored in the ECU storage unit 31 of the transmission destination.

Modifications

In the first and second embodiments, the number of first ECUs 11 is not limited to two, and may be one or three or more. The number of second ECUs 12 is not limited to one, and may be two or more. The number of communication buses Ba to which the first ECUs 11, the second ECU 12, and the management device 20 are connected is not limited to one, and may be two or more. The number of fifth ECUs 15 is not limited to three, and may be one, two, or four or more. The number of communication buses Bb to which the fifth ECUs 15 and the management device 20 are connected is not limited to one, and may be two or more.

The number of third ECUs 13 connected to the switch 16 is not limited to two, and may be one or three or more. The number of fourth ECUs 14 connected to the switch 17 is not limited to one, and may be two or more. The number of switches connected to an ECU is not limited to two, and may be one or three or more. When the number of switches connected to an ECU is three or more, in the second embodiment, two or more ECUs out of the plurality of ECUs connected to each of this plurality of switches are connected to the communication bus.

It is possible to combine the technical features (or "components") described in the first and second embodiments with each other, and new technical features may be produced by such combinations. The first and second embodiments disclosed above are exemplary in all respects and should not be regarded as limitations on the present disclosure. The scope of the present disclosure is indicated by the range of the patent claims, not the description given above, and is intended to include all changes within the meaning and scope of the patent claims and their equivalents.

The above description also includes the features given in the following appendix.

Appendix 1

A vehicle-mounted system including: a plurality of vehicle-mounted devices whose states transition to a low power state where power consumption is low or a high power state whose power consumption is larger than the power consumption in the low power state; a receiving unit for receiving data whose transmission destination is one out of the plurality of vehicle-mounted devices; and a processing unit for executing processing, wherein the processing unit causes a transition in the states of the plurality of vehicle-mounted devices to the low power state or the high power state, and determines, when the receiving unit has received data, whether a state of a transmission destination of the data received by the receiving unit is the low power state.

Appendix 2

A management device that manages power consumption of a vehicle-mounted system including a plurality of vehicle-mounted devices whose states transition to a low power state where power consumption is low or a high power state whose power consumption is larger than the power consumption in the low power state and a receiving unit for receiving data whose transmission destination is one out of the plurality of vehicle-mounted devices, wherein the management device includes a processing unit for executing processing, and the processing unit causes a transition in the states of the plurality of vehicle-mounted devices to the low power state or the high power state, and determines, when the receiving unit has received data, whether a state of a transmission destination of the data received by the receiving unit is the low power state.

The invention claimed is:

1. A vehicle-mounted system comprising:

a first vehicle-mounted device and a second vehicle-mounted device that are connected to a communication bus, the first vehicle-mounted device and the second vehicle-mounted device operable to operate in a low-power state where power consumption is low and a high power state whose power consumption is larger than the power consumption in the low power state, wherein the first vehicle-mounted device is operable to transition to the high power state upon receipt of either a first data or a second data, and the second vehicle-mounted device is only operable to transition to the high power state upon receipt of the second data; and a processing unit for executing processing, wherein when, in a low-power state where power consumption is low, the first vehicle-mounted device has received first data or second data via the communication bus, a state of the first vehicle-mounted device transitions to the high power state, when, in a low-power state where power consumption is low, the second vehicle-mounted device has received the first data via the communication bus, a state of the second vehicle-mounted device is maintained in the low power state, when, in the low-power state, the second vehicle-mounted device has received the second data via the communication bus, a state of the second vehicle-mounted device transitions to a high power state whose power consumption is larger than the power consumption in the low power state, and the processing unit instructs transmission of the first data or the second data via the communication bus to cause the state of the first vehicle-mounted device to transition to the high power state while maintaining the second vehicle-mounted device in the low power state, and instructs transmission of the second data via the communication bus to cause the states of the first vehicle-mounted device and the second vehicle-mounted device to transition to the high power state, wherein a maximum value of power consumed by the first vehicle-mounted device is below a maximum value of power consumed by the second vehicle-mounted device.

2. The vehicle-mounted system according to claim 1, comprising at least two of the first vehicle-mounted device.

3. The vehicle-mounted system according to claim 1, further including a third vehicle-mounted device to which power is supplied via a switch, wherein when the switch has switched from off to on, a state of the third vehicle-mounted device transitions from a low power state where power consumption is low to a high power state whose power consumption is larger than the power consumption in the low power state, and the processing unit instructs switching of the switch to on to cause the state of the third vehicle-mounted device to transition to the high power state.

4. The vehicle-mounted system according to claim 3, comprising at least two of the third vehicle-mounted device, wherein power is supplied to the plurality of third vehicle-mounted devices via the switch which is shared.

5. The vehicle-mounted system according to claim 3, wherein a dark current of each first vehicle-mounted device or the second vehicle-mounted device is below a dark current of each third vehicle-mounted device.

6. The vehicle-mounted system according to claim 3, wherein the third vehicle-mounted devices are not connected to the communication bus.

7. The vehicle-mounted system according to claim 1, wherein when execution of one vehicle operation out of a plurality of vehicle operations relating to a vehicle has been indicated, the processing unit causes a state of every vehicle-mounted device, out of a plurality of vehicle-mounted devices which include the first vehicle-mounted device and the second vehicle-mounted device and which transition to a low power state where power consumption is low or to a high power state whose power consumption is larger than the power consumption in the low power state, that is necessary to realize the vehicle operation whose execution has been indicated to transition to the high power state.

8. The vehicle-mounted system according to claim 7, wherein when a number of vehicle operations being executed out of the plurality of vehicle operations has fallen, the processing unit causes a state of a vehicle-mounted device that is unnecessary to realize the vehicle operations being executed to transition to the low power state.

9. The vehicle-mounted system according to claim 1, further comprising a receiving unit for receiving data whose transmission destination is one out of a plurality of vehicle-mounted devices, which include the first vehicle-mounted device and the second vehicle-mounted device and which transition to a low power state where power consumption is low or to a high power state whose power consumption is larger than the power consumption in the low power state, wherein when the receiving unit has received the data, the processing unit determines whether a state of the transmission destination of the data received by the receiving unit is the low power state.

10. A management device that manages power consumption in a vehicle-mounted system that includes a first vehicle-mounted device and a second vehicle-mounted device that are connected to a communication bus, the first vehicle-mounted device and the second vehicle-mounted device operable to operate in a low-power state where power consumption is low and a high power state whose power consumption is larger than the power consumption in the low power state, wherein the first vehicle-mounted device is operable to transition to the high power state upon receipt of either a first data or a second data, and the second vehicle-mounted device is only operable to transition to the high power state upon receipt of the second data, wherein the management device includes a processing unit for executing processing, and the processing unit instructs transmission of the first data via the communication bus to cause the state of the first vehicle-mounted device to transition to the high power state while keeping the second vehicle-mounted device in the low power state, and instructs transmission of the second data via the communication bus to cause the states of the first vehicle-mounted device and the second vehicle-mounted device to transition from the low power state to the high power state, wherein a maximum value of power consumed by the first vehicle-mounted device is below a maximum value of power consumed by the second vehicle-mounted device.

11. A management method that manages power consumption in a vehicle-mounted system that includes a first vehicle-mounted device and a second vehicle-mounted device that are connected to a communication bus, the first vehicle-mounted device and the second vehicle-mounted device operable to operate in a low-power state where power consumption is low and a high power state whose power consumption is larger than the power consumption in the low power state, wherein the first vehicle-mounted device is operable to transition to the high power state upon receipt of either a first data or a second data, and the second vehicle-mounted device is only operable to transition to the high power state upon receipt of the second data, the management method causing a computer to execute:

a step of instructing transmission of the first data via the communication bus to cause the state of the first vehicle-mounted device to transition to the high power state while keeping the second vehicle-mounted device in the low power state; and a step of instructing transmission of the second data via the communication bus to cause the states of the first vehicle-mounted device and the second vehicle-mounted device to transition from the low power state to the high power state, wherein a maximum value of power consumed by the first vehicle-mounted device is below a maximum value of power consumed by the second vehicle-mounted device.

12. A vehicle-mounted system comprising:

a first vehicle-mounted device and a second vehicle-mounted device that are connected to a communication bus, the first vehicle-mounted device and the second vehicle-mounted device operable to operate in a low-power state where power consumption is low and a high power state whose power consumption is larger than the power consumption in the low power state, wherein the first vehicle-mounted device is operable to transition to the high power state upon receipt of either a first data or a second data, and the second vehicle-mounted device is only operable to transition to the high power state upon receipt of the second data; and a processing unit for executing processing, wherein when, in a low-power state where power consumption is low, the first vehicle-mounted device has received first data or second data via the communication bus, a state of the first vehicle-mounted device transitions to the high power state, when, in a low-power state where power consumption is low, the second vehicle-mounted device has received the first data via the communication bus, a state of the second vehicle-mounted device is maintained in the low power state, when, in the low-power state, the second vehicle-mounted device has received the second data via the communication bus, a state of the second vehicle-mounted device transitions to a high power state whose power consumption is larger than the power consumption in the low power state, and the processing unit instructs transmission of the first data or the second data via the communication bus to cause the state of the first vehicle-mounted device to transition to the high power state while maintaining the second vehicle-mounted device in the low power state, and instructs transmission of the second data via the communication bus to cause the states of the first vehicle-mounted device and the second vehicle-mounted device to transition to the high power state; and a receiving unit for receiving data whose transmission destination is one out of a plurality of vehicle-mounted devices, which include the first vehicle-mounted device and the second vehicle-mounted device and which transition to a low power state where power consumption is low or to a high power state whose power consumption is larger than the power consumption in the low power state, wherein when the receiving unit has received the data, the processing unit determines whether a state of the transmission destination of the data received by the receiving unit is the low power state.

* * * * *